(12) United States Patent
Bodin et al.

(10) Patent No.: US 7,155,530 B2
(45) Date of Patent: Dec. 26, 2006

(54) MACRO FACILITIES FOR DIRECTION OF STREAMING DIGITAL CONTENT

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 09/881,919

(22) Filed: Jun. 14, 2001

(65) Prior Publication Data

US 2003/0014531 A1    Jan. 16, 2003

(51) Int. Cl.
G06F 15/16 (2006.01)
G06F 15/167 (2006.01)

(52) U.S. Cl. .................. 709/231; 709/203; 715/513; 719/310

(58) Field of Classification Search ........ 709/200–205, 709/217–235; 719/310–318; 717/100–106, 717/114; 725/112; 715/513; 714/755, 756
See application file for complete search history.

(56) References Cited

OTHER PUBLICATIONS

Application Server Solution Guide, Enterprise Edition: Getting Started, Nusbaum, May 2000, Nusbaum et. al., pp. 1-45, 416 434.*

Java Media Framework API Guide, JMF 2.0 FCS, Nov. 19, 1999, Sun Microsystems, pp. 1-66, 109-135, 173-178.*

"OpenJava: A Class-based Macro System for Java", Tatsubori et al., In reflection and software engineering, pp. 119-135, Ju 2000.*

* cited by examiner

Primary Examiner—John Follansbee
Assistant Examiner—Haresh Patel
(74) Attorney, Agent, or Firm—H. Artoush Ohanian; Mark S. Walker; Biggers & Ohanian, LLP

(57) ABSTRACT

Macro control of streaming digital content through servers where digital content is transcoded into streams of multimedia data in dependence upon remote director instructions including hyperlinked URLs. Embodiments include recording digital content, storing in computer memory macros comprising a URL and the first time when the URL was invoked to control digital content, the macros being stored in the order in which the URLs are first invoked; reading from computer memory the macros in the order in which the macros were stored; invoking each URL of each macro as a hyperlink at a second time, the second time being dependent upon the first time; retrieving, transcoding, selecting for inclusion in output streams, and communicating to client devices, in dependence upon remote director instructions, the digital content.

27 Claims, 7 Drawing Sheets

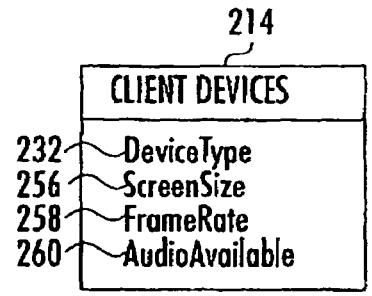
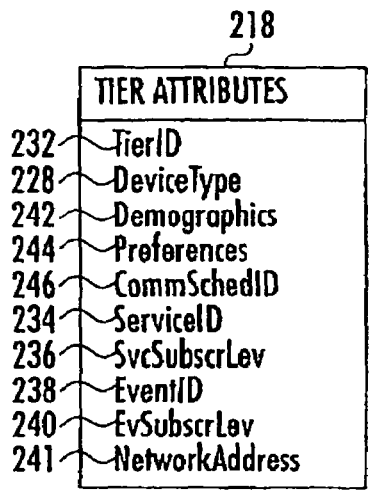
FIG. 2b
FIG. 2a
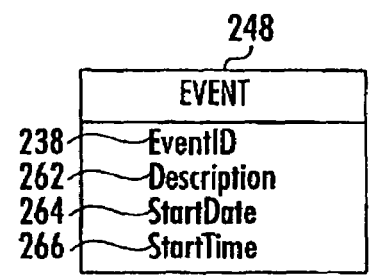
FIG. 2e
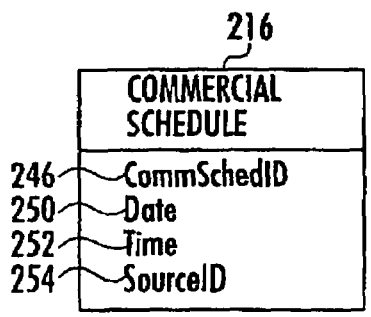
FIG. 2c
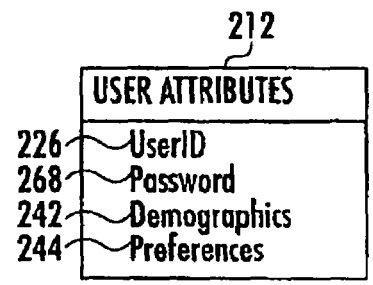
FIG. 2d

MACRO FACILITIES FOR DIRECTION OF STREAMING DIGITAL CONTENT

BACKGROUND OF THE INVENTION

1. Field of the Invention

The field of the invention is data processing, or, more specifically, methods, systems, and products for macro facilities for direction of streaming video.

2. Description of the Related Art

Streaming digital content delivered to users via networks is a powerful way of delivery substantive content of entertainment, education, and business communications to users. In the current state of the art, however, the users themselves are required to control presentations of streaming digital content. Many prior art implementations of streaming video and audio, including for example, RealPlayer™ from RealNetworks, Inc., of Seattle, Wash., Apple's QuickTime™, and Microsoft's Windows Media Player, actually require user to have some kind of video viewer application open in order to control video streaming. User controls are simple, including the analogues for the controls found on VHS videotape recorders, Play, Pause, Stop, and the like. During playback of a clip in such prior art devices, no director control is provided on the server side of the stream of digital content. Most prior art systems for formulating presentation of streaming digital content are oriented to formulating playback of clips recorded prior to their presentation over a network. To the extent that control systems exist for formulation and control of digitized output streams of live video and audio, such controls are expensive and specialized, typically requiring direct connection to particular servers, workstations, or other computers. There remains in the art therefore, a need for convenient, powerful, flexible, means of formulating and controlling streaming digital content.

SUMMARY

Disclosed are methods, systems, and computer program products for macro control of streaming digital content, implemented in conjunction with a network of computers including a content server through which digital content is transcoded into streams of multimedia data, the streams communicated via network to client devices, the digital content selected for inclusion in streams in dependence upon remote director instructions, the remote director instructions comprising hyperlinked URLs invoked through a network-capable device, the remote director instructions further comprising for each URL in a remote director instruction a computer program that is executed when the URL is invoked. Typical embodiments include recording in non-volatile, machine-readable storage, the digital content.

Typical embodiments also include storing in computer memory macros, each macro comprising a URL and a first time, the URL being a hyperlinked URL component of a remote director instruction, the first time being the time when the URL was first invoked through a hyperlink as part of a remote director instruction for control of streaming digital content, the macros being stored in the order in which the URLs are first invoked through hyperlinks. Typical embodiments also include reading from computer memory the macros in the order in which the macros were stored and invoking each URL of each macro as a hyperlink at a second time, the second time being dependent upon the first time, invoking each URL further comprising formulating and issuing a remote director instruction.

Typical embodiments include retrieving from non-volatile, machine-readable storage, transcoding, selecting for inclusion in output streams, and communicating to client devices, in dependence upon remote director instructions, digital content. Typical embodiments include recording approximately the original raw form of the digital content. Typical embodiments include executing upon a content server through a Java servlet within the content server computer programs identified by URLs, and in many embodiments, the computer programs comprise Java thread-level URL dispatch routines.

In many embodiments, transcoding, selecting for inclusion in output streams, and communicating to client devices are all carried out in dependence upon user preferences, user demographics, and client device attributes. In typical embodiments, transcoding, selecting for inclusion in output streams, and communicating to client devices are all carried out in dependence upon current real time remote director instructions received from a director coupled to the content server through a servlet within the content server.

Some embodiments include establishing a first start time for an event, the event comprising a multiplicity of sources of digital content, the event having a duration; recording in non-volatile, machine-readable storage, digital content; storing in computer memory, during the duration of the event, macros, each macro comprising a URL and a first elapsed time, the URL being a hyperlinked URL component of a remote director instruction, the first elapsed time being the elapsed time after the first start time when the URL was first invoked through a hyperlink as part of a remote director instruction for control of streaming digital content, the macros being stored in the order in which the URLs are first invoked through hyperlinks; establishing a second start time for retransmitting the event; reading from computer memory the macros in the order in which the macros were stored; invoking each URL of each macro as a hyperlink at a second elapsed time after the second start time, the second elapsed time being approximately equal to the first elapsed time of the macro, invoking each URL further comprising issuing a remote director instruction; and retrieving from the non-volatile, machine-readable storage, transcoding, selecting for inclusion in output streams, and communicating to client devices, in dependence upon remote director instructions, the digital content; whereby is effected a retransmission of an event.

Many embodiments include registering a user for a retransmission of an event, the retransmission of an event identified by an event identification code, the retransmission of an event comprising at least one video stream, at least one source, a start date and a start time; logging in the user for the retransmission of an event, logging in the user further comprising assigning values to user login attributes, the user login attributes comprising user identification, device type, network address, and a tier; and assigning a tier value in dependence upon the device type and the event identification code. In many such embodiments, the selections are dependent upon the tier. In many such embodiments transcoding includes transcoding in dependence upon the tier, and communicating to at least one of the client devices the output video stream includes communicating the output video stream to the network address.

Many embodiments include registering a user which further includes creating an event registration record comprising event registration attributes comprising user identification, event identification, event subscription level, start date, and start time. Many such embodiments include assigning a tier value which further includes assigning a tier value in dependence upon the event subscription level.

BRIEF DESCRIPTION OF THE DRAWINGS

FIG. 2a is a data structure diagram of exemplary embodiments of attributes of tiers.

FIG. 2b is a data structure diagram of exemplary embodiments of attributes of client devices.

FIG. 2c is a data structure diagram of exemplary embodiments of attributes of commercial schedules.

FIG. 2d is a data structure diagram of exemplary embodiments of attributes of users.

FIG. 2e is a data structure diagram of exemplary embodiments of attributes of events.

DETAILED DESCRIPTION OF EXEMPLARY EMBODIMENTS

Introduction

Figure 1:
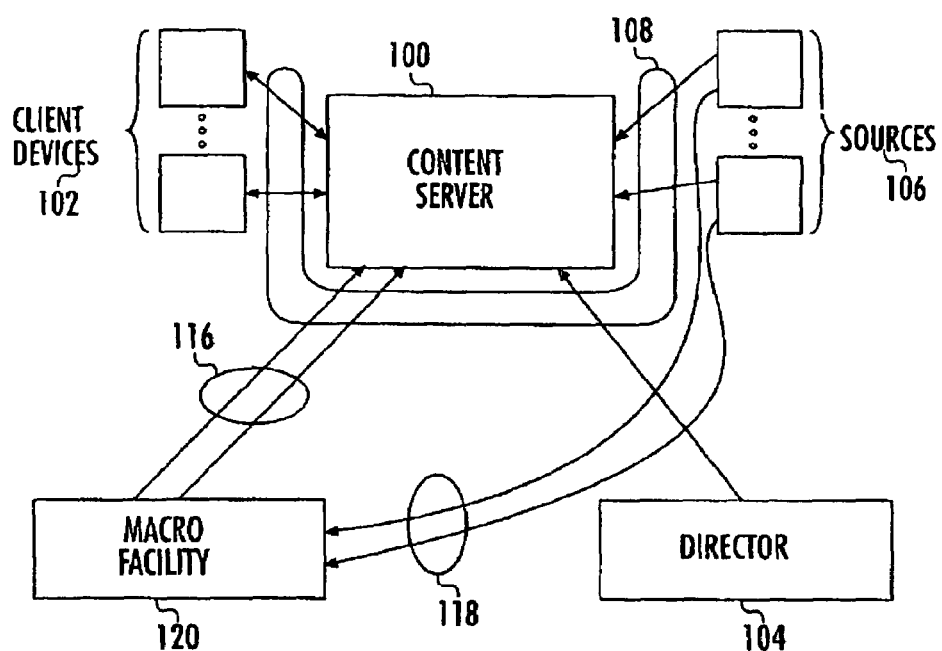
FIG. 1 is an overall block view of an embodiment of a system for remote direction of streaming digital content.

The present invention is described primarily in terms of methods for remote directions of networked streaming digital content presentations. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute" are used as synonyms, referring to individual elements of digital date. Aggregates of data elements are referred to as "records" or "data structures." Definitions of complex data structures that include member methods, functions, or software routines in addition to data elements are referred to as "classes." Instances of complex data structures are referred to as "objects" or "class objects."

"API" refers to an application program interface. APIs are standard sets of routines, protocols, and tools for building software applications.

The terms "client," "client device," and "device" are used as synonyms in this specification, referring to any device capable of accessing a server through a network. Examples of client devices are personal computers, special purpose devices that are internet-enabled, internet-capable personal data organizers, and others that will occur to those of skill in the art. Various embodiments of client devices are capable of wired and/or wireless network access. The use as a client device of any instrument capable of accessing a server through a network is well within the present invention.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling from client devices to one or more content servers is well within the scope of the present invention.

The term "servlets" refers to software modules that extend request/response-oriented servers, such as Java-enabled web servers. For example, a servlet might be responsible for taking data in an HTML order-entry form and applying the business logic used to update a company's order database. Servlets are to servers what applets are to browsers. Unlike applets, however, servlets have no graphical user interface. Servlets can be embedded in many different servers because typical servlet APIs assume nothing about a server's environment or protocol. As a practical matter, servlets are most widely used within HTTP servers, and many web servers support Java servlet technology.

"CGI" refers to the standard Common Gateway Interface for implementation of server scripts. Servlets are an effective replacement for CGI scripts. Servlets provide a way to generate dynamic documents that is both easier to write and faster to run. Servlets also address the problem of doing server-side programming with platform-specific APIs: they are developed with a Java Servlet API, a standard Java extension. In this fashion, in typical embodiments of the present invention, servlets are used to handle HTTP requests issued through browsers from client devices.

In conjunction with multithreading technology, which is strongly supported in Java for example, servlets are very supportive of collaboration among people. A single servlet can handle multiple requests concurrently, and can synchronize requests. Servlets can forward requests to other servers and servlets, so that servlets can be used to balance load among several servers that mirror the same content, and to partition a single logical service over several servers, according to task type or organizational boundaries.

"URL" means Universal Resource Locator, the standard method of associating world wide web data locations with network addresses for data communications. Many embodiments of the invention function by associating URLs with Java member methods in servlets on content servers, the member methods being called, run, invoked, or activated by invocation of associated URLs. In fact, some standard forms of URL are capable of directly identifying servlets, member methods within servlets, and providing data parameters for use in calls to member methods in servlets. Such URLs are typically invoked through areas of display screens in client devices, the display screen areas being activated for receipt of mouse clicks, gestures, shortcuts, keystrokes on keyboards, or other physical indications of URL selection or invocation.

Servlet URLs can be used in HTML tags, where, for example, would otherwise be found URLs for CGI scripts or URLs identifying file locations on web sites. Servlet URLs are used, for example, as destinations of HTML anchors, as actions in HTML forms, and as locations to be used when HTML META tags direct that HTML pages be refreshed.

"World Wide Web," or more simply "the web," refers to the well-known system of internet protocol ("IP") servers that support specially formatted documents, documents formatted in a language called HTML for HyperText Markup Language. The term "web" is used in this specification also to refer to any server or connected group or interconnected groups of servers that implement the HyperText Transport Protocol, "HTTP," in support of URLs and HTML documents, regardless whether such servers or groups of servers are coupled to the world wide web as such.

HTML supports hyperlinking URLs connecting to other documents as well as graphics, audio, and video. Hyperlinks support changing documents by invoking URLs through "hot spots." In this specification, the term "hot spot" is used to refer to any area of a display, the area being associated with a particular URL, which area is sensitive to physical indications of invocation, including for example, mouse clicks on radio buttons and shortcut graffiti gestures on scratch pads of personal data organizers such as Palm Pilots™.

Detailed Descriptions

This specification discloses example embodiments of methods, systems, and products for controlling and delivering digital content to a number of clients. In typical embodiments, the clients need not control separate digital content feeds but rather will get a consistent feed based on the preemption and routing of the digital feeds from a content server. In typical embodiments, a director controls the content server, and most embodiments support as a director any device that can attain network access. More specifically, there is in typical embodiments no requirement that the director be a terminal directly coupled to the content server.

Typical embodiments of the inventive methods and systems provide means for distributing any form of digital content from any digital media to any number of web clients while maintaining a control mechanism by a remote director. This control mechanism or director further supports changing digital content sources and streams, and changing attributes such as frame rates, so as to provide seamless presentations to any number of clients. Typical embodiments of the director mechanism allow for a hands-off approach in terms of the client devices. Users in typical embodiments are not required to operate any controls on client devices but rather can simply view the contents of the streaming presentation.

Referring to FIG. 1, an aspect of the invention is seen as a macro facility (120) for remote direction of streaming digital content from a multiplicity of sources (106) of digital information to a multiplicity of client devices (102) implemented upon a network (108) of digital computers, at least one of the digital computers comprising a content server (100) upon which system is implemented in computer memory and at least one computer processor. The aspect of the invention depicted in FIG. 1 includes embodiments of recording an original form of raw digital content (118) and later playing back (116) the recorded digital content under control of the macro facility (120).

Figure 2:
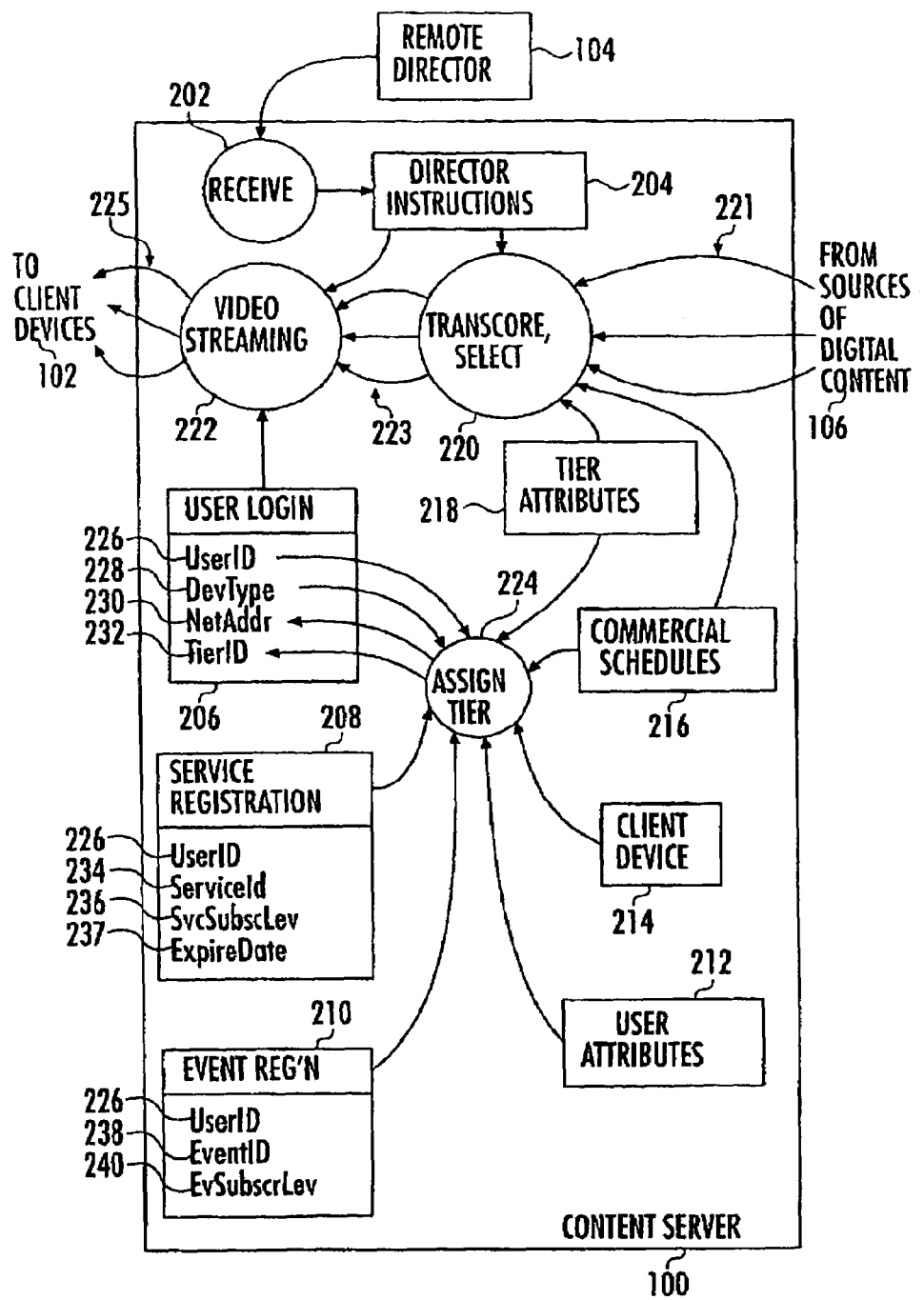
FIG. 2 is a process flow diagram illustrating several example embodiments of methods of remote direction of streaming digital content.

A more detailed example embodiment is shown in FIG. 2 as including a method of remote direction of streaming digital content. The example of FIG. 2 includes also receiving (221) digital content from sources (106), the digital content having many different digital formats. Examples of digital formats useful with various embodiments of the invention include JPEG, MP3, MPEG, GIF, HTML, text, XML, and the like. Other digital formats for digital content will occur to those of skill in the art, all of which formats are useful with embodiments of the present invention.

A further embodiment shown in FIG. 2 includes receiving (202), from a remote director (104), and storing in computer memory, remote director instructions (204), the remote director instructions including instructions for selections of digital content for inclusion in an output stream. The illustrated embodiment further includes transcoding (220) the digital content from sources into digital content having streaming format (223).

The illustrated embodiment also includes in at least one output stream (225), in dependence upon the remote director's instructions, digital content having streaming format. The illustrated embodiment, as do typical embodiments, includes communicating through a data communications network to at least one client device (102) the output stream (225).

In typical embodiments, client devices comprise client device attributes, and transcoding includes transcoding in dependence upon the client device attributes. More specifically, for example, transcoding includes in typical embodiments transforming digital data content to conform to a device's screen size, color requirements, or audio availability. Client device attributes typically include, for example, device type, screen size, frame rate, and audio availability.

In typical embodiments, transcoding includes transforming JPEG images into streaming format. In many embodiments, transcoding includes transforming a digitized digital content feed from a video camera into streaming format. In many embodiments, transcoding includes transforming a digitized video feed from a video camera into streaming format for a particular screen size or a particular frame rate. Transcodings including other data transformations as will occur to those of skill in the art. Any transformation of digital content is well within the scope of the present invention.

In many embodiments, the remote director (104) comprises a personal computer coupled through a network to the content server (100), and the method in many embodiments includes sending from the remote director to the content server remote director instructions (204). In many embodiments, sending director instructions includes invoking through URLs displayed on a terminal of the remote director member methods of servlets installed on the content server, each URL invoking a single servlet member method, each servlet programmed to administer threads of execution to carry out remote director instructions. In many embodiments servlets comprise member methods in Java objects, and invoking a servlet, or invoking a servlet member method, means to call a public member method in a Java object. In many embodiments, the member methods are implemented as Java thread-level URL dispatch routines. Remote director instructions typically comprise at least one instruction to select for transcoding and streaming digital content from a specific source.

More specifically, for example, servlet URLs are typically implemented in the following form:
browser url="http://myIP:8080/servlet/myservlet?parm1=parameter1
browser url="http://myIP/myservlet?parm1=1&parm2=2

The following is a typical example of an embodiment of servlet structure represented in pseudocode:

```
import javax.servlet.*;
import javax.servlet.http.*;
public class myservlet extends HttpServlet
{
    public void init(ServletConfig conf) throws ServletException
    {
        super.init(conf);
        ...
    }
    public void service(HttpServletRequest req,
    HttpServletResponse res) throws
            IOException { }
    public void destroy( ) { }
}
```

The following is a typical example of a computer program, in this particular example, a Java member method implemented as a Java thread-level URL dispatch routine and depicted in the following pseudocode:

```
        public void service(HttpServletRequest req,
        HttpServletResponse res) throws
                IOException
        {
            request = req.getParameter("request");
            if(request.equalsIgnoreCase("view"))
                    getView( );
            if(request.equalsIgnoreCase("reset"))
                    reset( );
        }
```

Figure 4A:
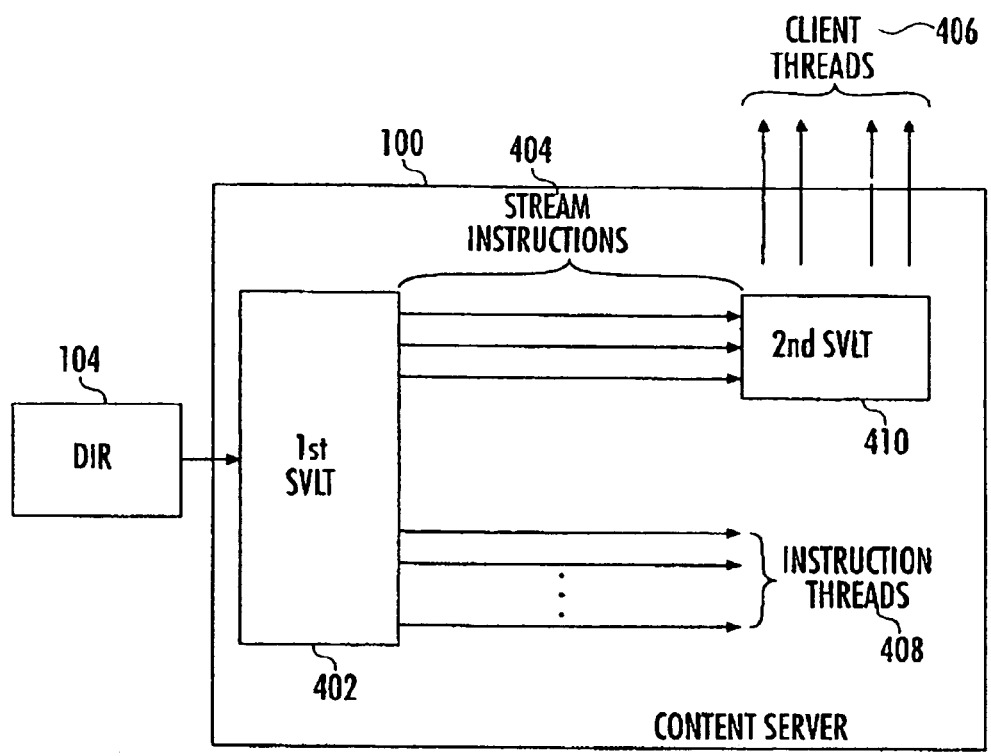
FIG. 4a illustrates an example embodiment of an alternative servlet architecture.
Figure 4B:
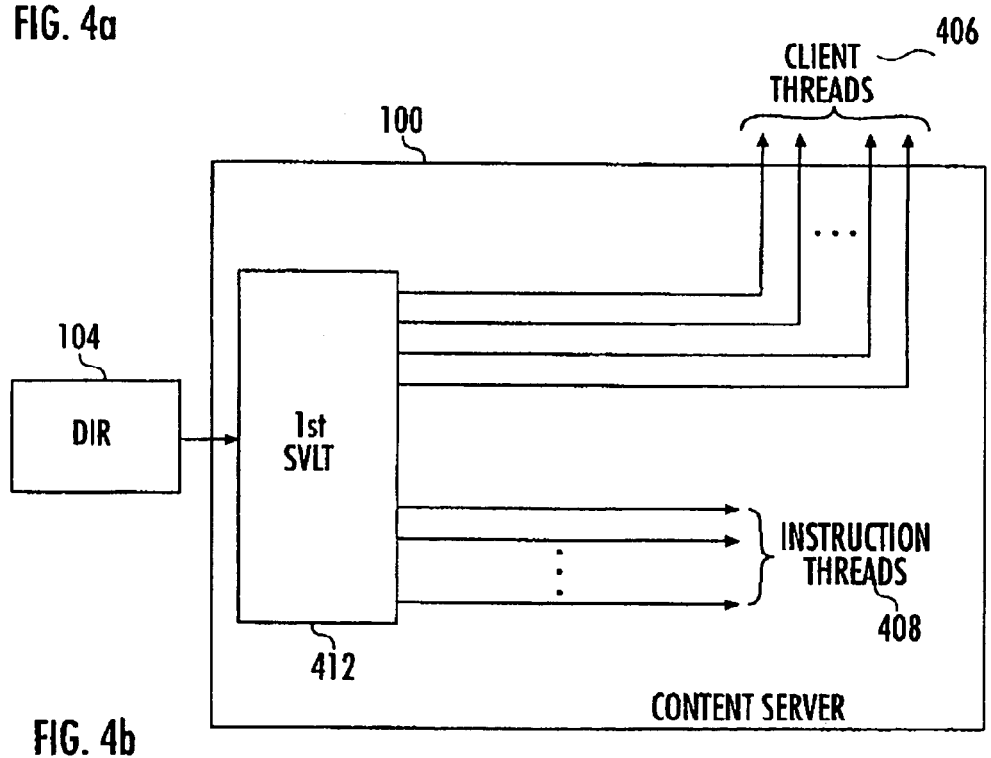
FIG. 4b illustrates an example embodiment of an alternative servlet architecture.

FIGS. 4a and 4b illustrated embodiments of alternative servlet architectures. The example embodiment shown in FIG. 4a includes a director (104) coupled for data communications to a first servlet wherein the first servlet administers threads of execution for remote director instructions (408). The example architecture of FIG. 4a includes also a second servlet (410), the second servlet being configured to administer threads of execution which themselves carry out data communications with individual client devices.

In typical embodiments, each thread of execution for a client device (406) is assigned to a particular client device located on a network by an internet protocol address known to the thread. In the example architecture of FIG. 4a, the first servlet is coupled to the second servlet for communication of data and for communication of instructions by calls to member methods within the second servlet. In the example architecture of FIG. 4a, the coupling between the two servlets is accomplished through threads of execution administered by the first servlet. In embodiments of this kind it is typical that each thread would be assigned responsibility for carrying out one remote director instruction regarding control of the streams of digital content communicated to client devices by use of the client communications threads of the second servlet. Further alternative embodiments of inter-servlet communications and control will occur to those of skill in the art, all such embodiments being well within the scope of the present invention.

FIG. 4b illustrates an alternative example embodiment of servlet architecture useful with the present invention. In the example embodiment of FIG. 4b, both the threads for client communications (406) and the threads for execution of remote director instructions (408) are implemented through a single servlet (412). Alternative example architectures include implementation of an additional servlet administering threads of execution for data conversion and transcoding, or an additional servlet administering threads of execution for selecting particular sources of digital content for particular output streams. Further alternative embodiments of servlet architecture will occur to those of skill in the art, all such embodiments being well within the scope of the present invention.

It is useful to note that in typical embodiments, there is no required physical difference between the director and the client devices. Both are often personal computers coupled for data communications through a network to a content server. What distinguishes the director in typical embodiments is that the director in logging on to the server is accorded access through URLs to member methods to which access is restricted to users not having director privileges. In many embodiments, only one director is allowed access at any particular time, to reduce the risk of conflicting director instructions, although there is no particular exclusion within the invention itself of allowing more than one director coupled to a content server.

Many embodiments of the present invention include registering a user for a service, the service being identified by a service identification code. FIG. 2 at reference 208 shows an example embodiment of a data structure representing a user's registration for a service, including a user identification code (226), a service identification code (234), and a service subscriber level (236). The service subscriber level is included in the illustration because many embodiments associate fee structures and levels of service with service subscription levels. Services typically comprise aggregations of digital content streamed through one or more websites to users through client devices over an extended period of time. Indeed, in typical embodiments, the services themselves are not time-limited, although the user's service registrations often are (237). User's service registrations are often time-limited because fee structures impose time limits on the service registrations as such, although such time limits to not affect the services themselves.

Typical embodiments include logging in a user for the access to a service. Logging in a user typically includes assigning values to user login attributes (206), including for example, user identification (226), device type (228), network address (230), and a tier (232). The user identification typically is determined through a login prompt. The device type in typical embodiments is derived from a browser header at logon. The network address in many embodiments is an internet protocol address, in many embodiments used to comprise a socket.

The tier is an identifier for a group of client devices identified according to grouping factors such as, for example, device type, subscription level, user demographics or user preferences. Tiers in typical embodiments are identified in tier attribute data structures such as the one illustrated for example at reference 218 in FIG. 2. A more detailed example embodiment of a data structure representing a tier is illustrated at FIG. 2a, where an example tier is shown as including a tier identification code (232), a device type (228), a data element for user demographics (242), a data indication of user preferences (244), a commercial schedule identification code (246), a service identification code (234), a service subscriber level (236), an event identification code (238), and an event subscription level (240).

Demographics include such user attributes as age, residence location, income level, occupation, and other demographics as may occur to those of skill in the art. Embodiments using any demographic are well within the scope of the present invention. User preferences include attribute indicators of special needs in support of disabilities, content limitations such as exclusions of adult material, profane language, or depictions of violence, preferences regarding subjects of commercial messages, and other user preferences as occur to those of skill in the art. Embodiments using any attribute indicators of any user preference regarding digital content are well within the scope of the present invention.

Typical embodiments also include assigning a tier value in dependence upon the device type and the service identification code. In typical embodiments, director selection of digital content and transcoding are also dependent upon tiers. In typical embodiments, registering a user includes creating a service registration record (208) comprising service registration attributes comprising user identification (226), service identification (234), service subscription level (236), and service expiration date (237), and in such embodiments, assigning a tier value typically include assigning a tier value in dependence upon the service subscription level.

The director in such embodiments has the capability of formulating output streams according to tier. Thus an embodiment utilizing the example structure shown in FIG. 2a, has the capability of presenting digital content in one or more output streams comprising a particular tier, for example, for a hand-held, network-capable, personal data organizer having a screen size of 800×600 pixels (according to device type 228), with content filtered to exclude graphic violence (according to user preference 244), with commercial content filtered to include automobile advertisements (user preference), with commercial content further filtered to exclude automobile advertisements for automobiles costing less than $30,000 (demographics 242), with commercials scheduled so as to occur no more than once per half-hour (in dependence upon service subscription level 236). Typical director access to servlets on the content server means that director instructions issued at any time by invoking URLs with as little as a single mouse click, one digitizing pad gesture, or a single keystroke, seamlessly and immediately alter tier structure and therefore the presentation of digital content to users of client devices in a tier.

Typical embodiments also include communicating to at least one of the client devices an output stream (225). In such embodiments, communicating the output stream or streams further comprises communicating the output stream to the network address (230) associated with a user's login (206 on FIG. 2). It is useful to note that in many embodiments, the network address associated with a user's login is a network address, typically associated with a URL, through which digital content is provided for a tier, as at the example at reference (241) in FIG. 2a. That is, in such embodiments, as shown in FIG. 2, the tier assignment function (224) assigns to the user login (206) a tier (232) according to client device type (214), user attributes (212), commercial schedules (216), and service registrations (208) or event registrations (210).

Many embodiments that assign network addresses to tiers, as shown for example at reference 241 in FIG. 2a, do not use network addresses in user logins, because in such embodiments, the stream output to the user and the user's client device will be directed through the network address identified with the tier. Some embodiments do not use tiers; such embodiments typically therefore assign a network address to individual user logins. In many embodiments, the assigned network address, whether it is assigned directly through a user login or indirectly through a tier structure, identifies a URL to which the client device browser is directed at login, the URL identifying a website location through which an output stream for the tier is delivered to client devices associated with user logins having the same assigned tier.

Turning again to FIG. 2, an additional example embodiment is shown as including registering a user for an event (210). Event registrations (210) typically include attributes for user identification (226), event identification (238), and event subscription level (240). Events are aggregations of digital content presented through networks to client devices, the events having a start date (264) and a start time (266), that is, a defined approximate beginning time, events typically being identified as shown in the example of FIG. 2e, by an event identification code (238). Events typically aggregate at least at least one output stream and at least one source.

The invention itself does not necessarily require event codes as such, although most embodiments do employ some means, such as event codes, of associating the aggregate of sources comprising an event. Alternative ways of identifying an aggregate of sources includes, for example, listing the sources in a list and using a single server for an event in which all sources available to the server are considered sources for an event. Events in typical embodiments are distinguished from services by possession of a starting time and typically also a defined duration, or an approximate duration, whereas services typically are ongoing for undetermined durations.

Embodiments comprising events typically include logging in users for the event, logging in users typically including assigning values to user login attributes (206), the user login attributes typically including user identification (226), device type (228), network address (230), and a tier identification (232).

In embodiments including events, tier values typically are assigned in dependence upon event identification codes (240). Many embodiments that include events also assign tiers in dependence upon event subscription levels (240). Of course many such embodiments also assign tiers in dependence upon device types, demographics, or user preferences.

Figure 3:
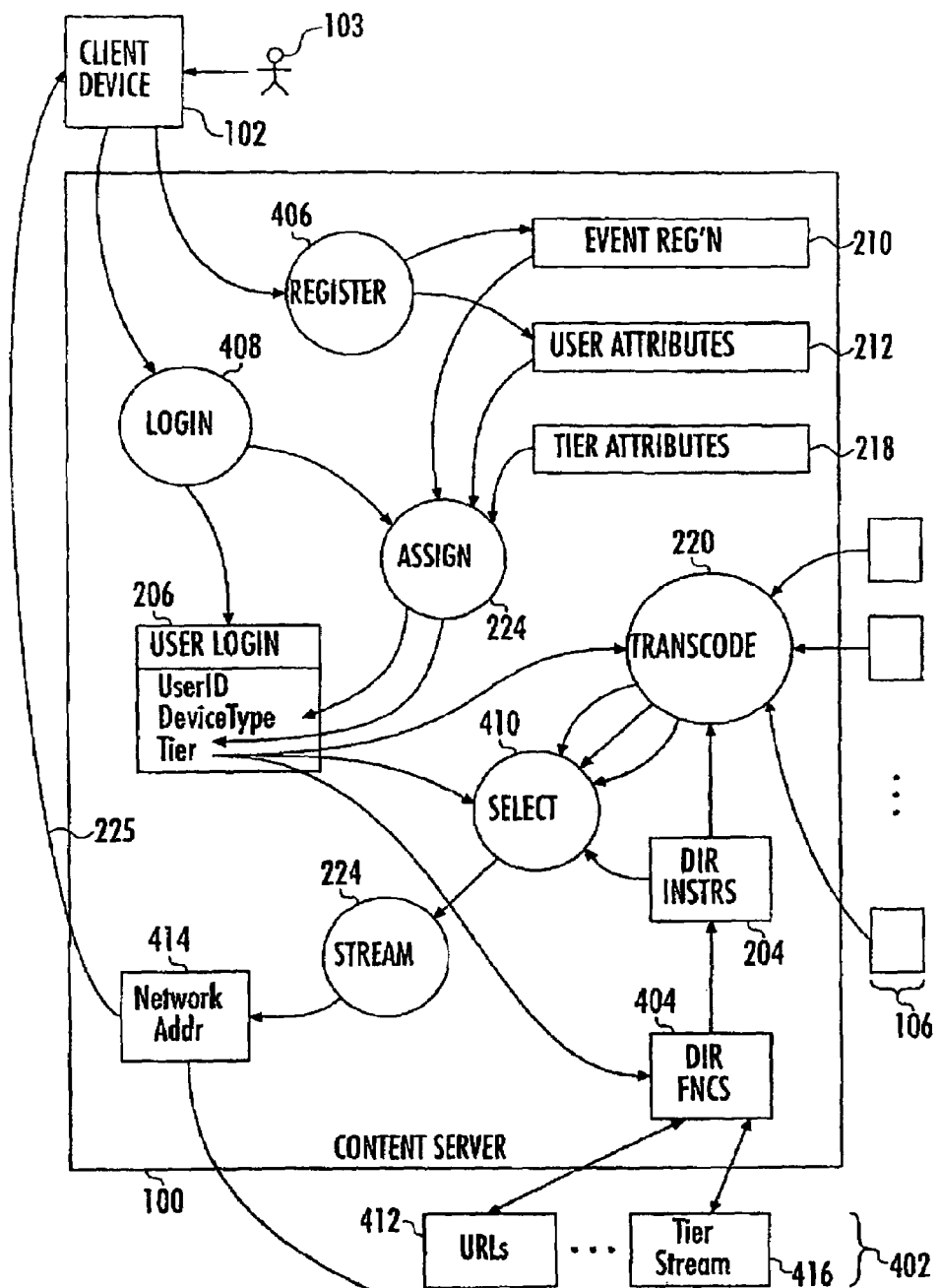
FIG. 3 is an example embodiment illustrated as a use case.

Turning now to FIG. 3, an embodiment of the method of the present invention is illustrated as a use case for an event comprising a football game. In the illustrated embodiment of FIG. 3, a user (103) through a client device (102) registers (406) for an event. The use in the illustrated case has no previous service registration, is therefore unknown to the content server, and user attributes (212), including preferences and demographics, are therefore gathered at registration. Registering for this previously unknown user includes assigning to the use a user identification code.

After registering for the event, either prior to or after the event begins, the user logs in (408) to view the event. At login, the user login record (206) is created and assigned (224) a device type and a tier. The device type is either taken from a default device type stored in user attributes at the time of registration, or is taken from a browser header at the time of login. The tier is assigned by matching user attributes with tier attributes among more than one tier record and selecting a tier whose demographics, user preferences, and device type match or approximately match the user's demographics, user preferences, and/or device type.

Now in the illustrated embodiment of FIG. 3, transcoding (220) and digital content selection (410) for an output stream for the tier are all accomplished in dependence upon the tier value so assigned. If, for example, the tier assigned on the basis of device type and user attributes has attributes including a device being a high definition video screen, no preferences as to language, violence, or adult content, and demographics of high income bracket, an output stream having digital content meeting these requirements is formulated by transcoding and selecting digital content in response to director instructions. The output stream (225) so formulated is communicated (224) in the illustrated embodiment to the user (103) through the client device (102) from the network address (414) associated by the tier (218) with the output stream (225).

If after registration no tier exists that is a good match for the user attributes, a new tier is created having attributes that well match user attributes. Creating a new tier merely includes typing in through a keyboard, for example, into a new tier record, a new set of tier attributes including a network address or URL through which an output stream formulated in accordance with the new tier attributes is communicated to client devices. In typical embodiments the quality of match between tier attributes and user attributes is determined according to tier selection criteria. Many formulations of tier selection criteria will occur to those of skill in the art. Any tier matching criteria used with any embodiment of the invention are well within the scope of the invention.

In the illustrated embodiment of FIG. 3, the software functions (404) associated with a director are stored in a content server (100). Coupled through a network for data communication to the content server in the illustrated embodiment are several personal computers comprising director workstations (402). In typical embodiments of this kind, at least one of the director workstations (416) is configured to present output streams formulated for tiers in dependence upon director's instructions. In such embodiments, at least one of the director workstations (412) is configured to present for invocation through a user interface URLs that in turn invoke director functions or member methods comprising director functions such as servlets that when invoked or called issue or comprise director instructions for transcoding and selecting digital content to formulate of an output stream.

In typical embodiments that include events, selections effected by director instructions are dependent upon the tier, and transcoding includes transcoding in dependence upon the tier. Director instructions for selection of digital content and transcoding in dependence upon tier result in output streams formulated and presented according to tier, and in such embodiments, communicating to client devices the output stream includes communicating the output stream to a network address associated with a user login. As described above, typical embodiments utilizing events assign the network address for communication of output streams through the tier (reference 241 on FIG. 2a).

Figure 5:
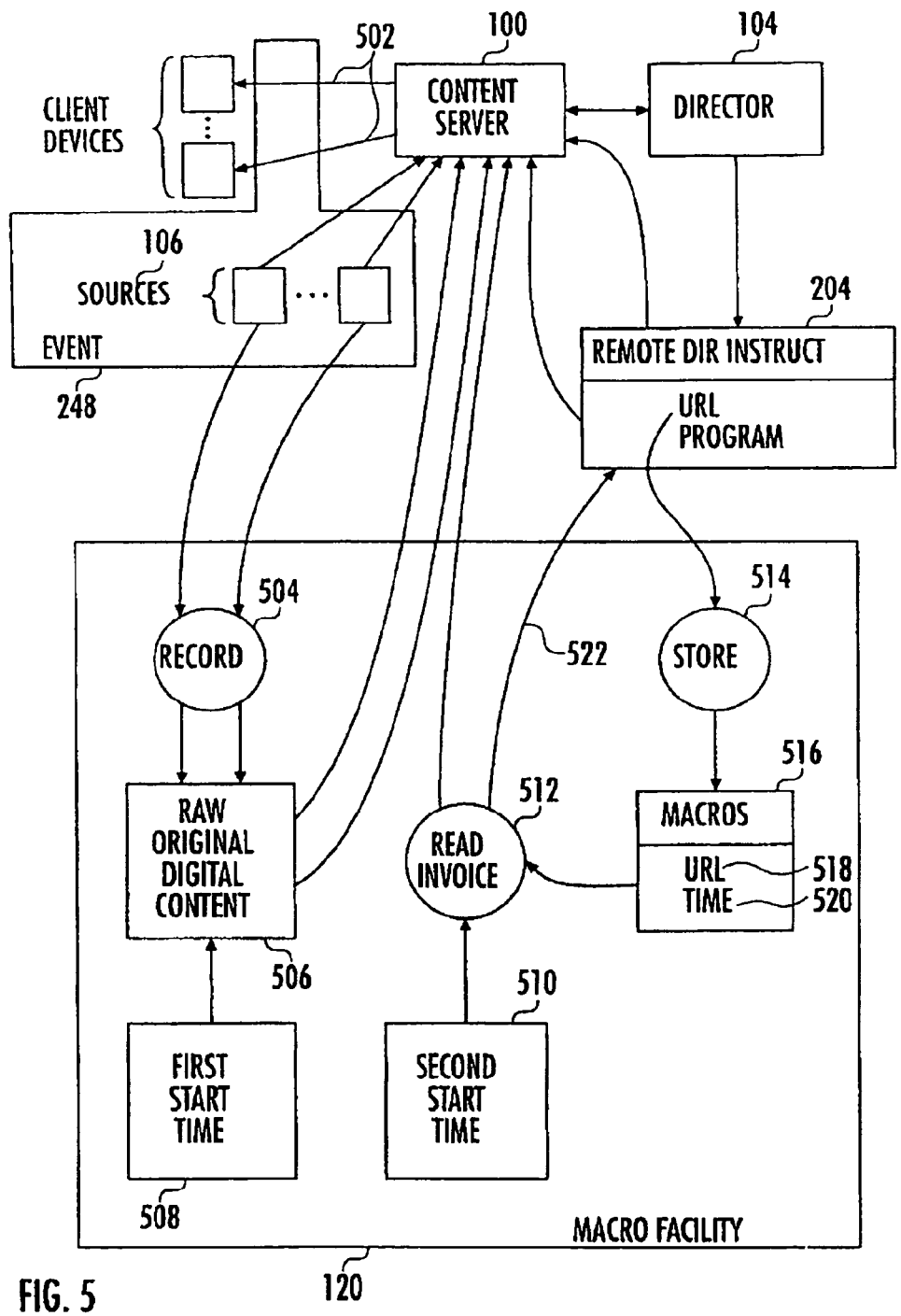
FIG. 5 is a process flow diagram for an example embodiment of a macro facility.

Turning now to FIG. 5, a further aspect of the invention is seen illustrated in an example embodiment of a macro facility implemented in the illustrated example as a method of macro control of streaming digital content. The example embodiment of FIG. 5 includes implementing the example method upon a networked system of computers including a content server (100) through which digital content is transcoded into streams of multimedia data, the streams (502) communicated via network to client devices (102), the digital content selected for inclusion in streams in dependence upon remote director instructions as described in more detail above, the remote director instructions comprising hyperlinked URLs invoked through a network-capable device, the remote director instructions further comprising for each URL in a remote director instruction a computer program that is executed when the URL is invoked.

The illustrated example method includes recording (504) in non-volatile, machine-readable storage (506), the digital content in approximately its original form. The illustrated example method includes storing (514) in computer memory macros (516), each macro comprising a URL (518) and a first time (520), the URL being a hyperlinking URL component of a remote director instruction (204), the first time being the time when the URL was first invoked through a hyperlink as part of a remote director instruction for control of streaming digital content. In typical embodiments, the macros are stored in the order in which the URLs are first invoked through hyperlinks.

Typical embodiments of the kind illustrated include reading from computer memory the macros in the order in which the macros were stored, invoking each URL of each macro as a hyperlink at a second time, the second time being dependent upon the first time. Invoking each URL of each macro in sequence in dependence upon the first time results in a playback of the original digital content, selected, transcoded, and streamed to client devices in a fashion substantially similar to the original transmission of the digital content to client devices.

The dependency upon the first time is useful in organizing the playback because the interval between remote director instructions is maintained at approximately the same interval as existed during the original transmission. In some embodiments, the dependence upon the first time is calculated by reference to an arbitrarily selected start time for the playback, and some embodiments employ a system clock reset to simulate the original times stored in the macros. Alternative methods of establishing proper time dependency will occur to those of skill in the art. Any reasonable means or method of establishing a dependency of a playback time on the original recorded time is well within the scope of the invention.

Invoking each URL in typical embodiments includes formulating each URL into a remote director instruction and issuing (522) the instruction to a content server. Typical embodiments include retrieving from the non-volatile, machine-readable storage, transcoding, selecting for inclusion in output streams, and communicating to client devices, in dependence upon remote director instructions formulated from the stored macros, the recorded original digital content.

Figure 6:
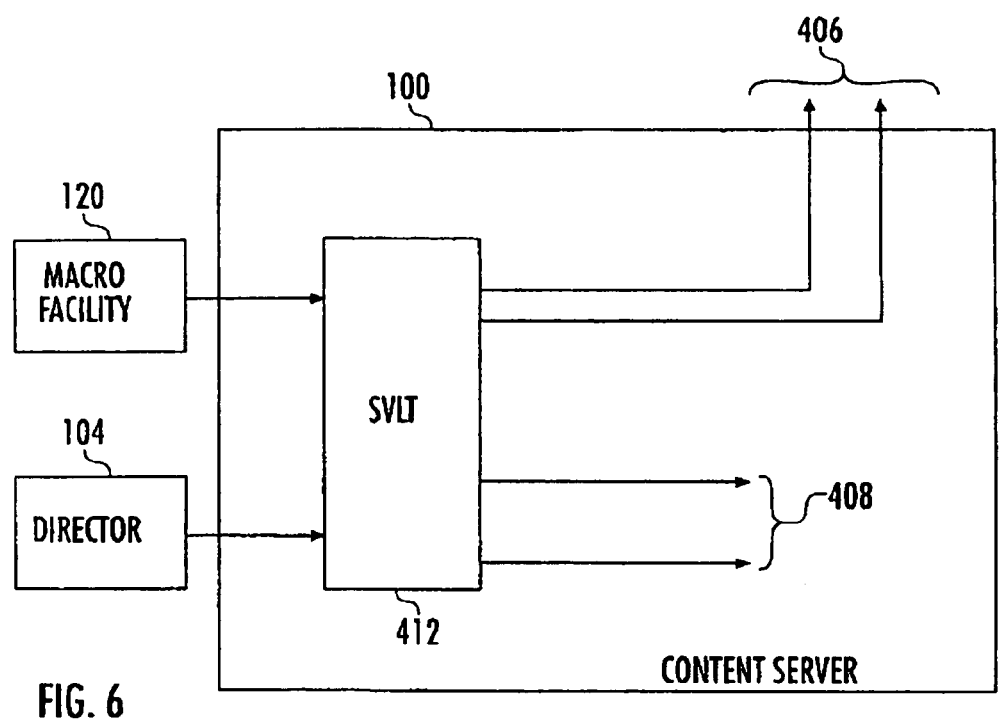
FIG. 6 illustrates an example embodiment of an alternative servlet architecture including a coupled macro facility.

FIG. 6 illustrates a useful aspect of typical embodiments. In the example embodiment of FIG. 6, a macro facility (120) is coupled for data communications to a content server (100) through a servlet (100). The architecture of the example in FIG. 6 is similar to that of FIG. 4b, using a single servlet to administer both threads for executing director instructions (408) and threads for streaming content to particular client devices (406). In the illustrated example a director (104) is also coupled through the servlet to the content server. It is useful to note that from the point of view of the server and the servlet, there is no requirement within the present invention for it to make any difference whether a particular remote director instruction is received directly from the director in real time or received from the macro facility as part of a playback of a series of previously recorded macros.

One of the benefits of this architecture is that the director has real time control of the playback exactly as if the recorded digital content were being transmitted for the first time. The director in typical embodiments is empowered to allow the recorded macros to play back with little or no real time intervention. The director in such embodiments is capable of issuing remote director instructions in real time, however, so as to correct for conditions currently affecting the retransmission of digital content, such as, for example, sequences of commercial content that differs from the commercial content that was transmitted as part of the original transmission of the recorded digital content.

It is useful for playback to record the original digital content in approximately its raw form, prior to data transcoding or formatting for digital streaming. In embodiments in which the digital content is available from recordings or computer storage in approximately its raw form, then the retrieval from storage of the digital content is available for treatment by transcoding, selection and streaming just as was the original. On this basis, the retransmission, including transcoding, selection, and streaming is carried out in dependence upon user preferences, user demographics, and client device attributes, in a fashion substantially identical to the original despite the fact that the user demographics, user preferences, and client device attributes are very different from what they were at the time of the original transmission. In this sense, the idea that a retransmission is carried out in a fashion substantially identical to the original does not require that the retransmission in fact have identical form and content to the original.

The detail described here is that the retransmission retains its original capability of being configured in dependency upon user preferences, demographics, and client device attributes. For understanding, contrast this quality of many embodiments with embodiments that record only the output streams for playback. When only the output streams are available for playback, the user preferences, demographics and device attributes that affected the formulation of the output streams are fixed, with no capability of changing them and thereby affecting the formulation of output streams at the time of retransmission. Moreover, when only the output streams are available for recorded playback, the usefulness of real time director control at the time of playback is reduced because the director no longer has the same capability of affecting the formulation of the prerecorded output streams. In embodiments that include recording the raw original digital content, at the time of retransmission, no formulated output streams exist; instead, the output streams are formulated in real time, in the same fashion as was used to conduct the original transmission.

Turning again to FIG. 5, a more detailed example embodiment is shown as including establishing a first start time (508) for an event (248), the event comprising a multiplicity of sources of digital content (106). In typical embodiments, the event has a duration, a beginning time, and an ending time.

The illustrated example embodiment includes recording in non-volatile, machine-readable storage, the original digital content of an event, and storing in computer memory, during the duration of an event, macros, each macro comprising a URL and a first elapsed time, the URL being a hyperlinking URL component of a remote director instruction. In typical embodiments, the first elapsed time is the elapsed time after the first start time when the URL was first invoked through a hyperlink as part of a remote director instruction for control of streaming digital content. In typical embodiments, the macros are stored in the order in which the URLs are first invoked through hyperlinks.

Typical embodiments include establishing a second start time (510) for retransmitting the event and reading from computer memory the macros in the order in which the macros were stored. Typical embodiments include invoking each URL of each macro as a hyperlink at a second elapsed time after the second start time, the second elapsed time being approximately equal to the first elapsed time of the macro. In typical embodiments, invoking each URL includes issuing a remote director instruction (522). Typical embodiments include retrieving from the non-volatile, machine-readable storage, transcoding, selecting for inclusion in output streams, and communicating to client devices, in dependence upon remote director instructions, the original recorded digital content.

Embodiments of the kind illustrated often include registering a user for a retransmission of an event. In many embodiments, the retransmission of an event is identified by an event identification code. In many embodiments, the retransmission of an event includes at least one output stream, at least one source, a start date and a start time. In typical embodiments, logging in the user for the retransmission of an event includes assigning values to user login attributes. In typical embodiments, user login attributes include user identification, device type, network address, and a tier. Many embodiments include assigning a tier value in dependence upon device attributes. Many embodiments include assigning tier values in dependence upon and event identification codes.

In many embodiments, selecting digital content for inclusion in output streams is accomplished in dependence upon a tier. In many embodiments, transcoding is carried out in dependence upon a tier. In many embodiments, communicating to client devices output video streams includes communicating an output video stream to a network address. In many embodiments, network addresses are internet protocol addresses.

In many embodiments that include registering users for events, registering a user includes creating an event registration record comprising event registration attributes such as user identification, event identification code, event subscription level, start date, and start time. Registering users in such embodiments typically includes assigning a tier value, and tiers are typically assigned in dependence upon an event subscription level.

It will be understood from the foregoing description that various modifications and changes may be made in embodiments of the present invention without departing from its true spirit. All exemplary embodiments described in this specification are mere examples, not limiting definitions of the invention. It is intended that descriptions in this specification are only for purposes of illustration and are not to be construed in a limiting sense. The scope of this invention should be limited only by the language of the following claims.

What is claimed is:

1. A method of macro control of streaming digital content, the method implemented in conjunction with a networked system of computers including a content server through which the digital content is transcoded into streams of multimedia data, the streams communicated via network to client devices, the digital content selected for inclusion in streams in dependence upon remote director instructions, the remote director instructions comprising hyperlinked URLs invoked through a network-capable device, the remote director instructions further comprising for each of the URLs in the remote director instruction a computer program that is executed when the URL is invoked, the method comprising the steps of:

recording in non-volatile, machine-readable storage, the digital content.

storing in computer memory macros, each of the macros comprising a URL and a first time, the URL being a hyperlinked URL component of a remote director instruction, the first time being the time when the URL was first invoked through a hyperlink as part of the remote director instruction for control of streaming digital content, the macros being stored in the order in which the URLs are first invoked through hyperlinks;

reading from computer memory the macros in the order in which the macros were stored;

invoking each of the URLs of each of the macros as a hyperlink at a second time, the second time being dependent upon the first time, invoking each of the URLs further comprising formulating and issuing a remote director instruction; and retrieving from the non-volatile, machine-readable storage, transcoding, selecting for inclusion in output streams, and communicating to client devices, in dependence upon the remote director instructions, the digital content.

2. The method of claim 1 wherein recording the digital content further comprises recording approximately an original raw form of the digital content.

3. The method of claim 1 wherein issuing a remote director instruction further comprises executing upon a content server through a Java servlet within the content server computer programs identified by the URLs.

4. The method of claim 3 wherein the computer programs comprise Java thread-level URL dispatch routines.

5. The method of claim 1 wherein the transcoding, selecting for inclusion in output streams, and communicating to client devices are all carried out in dependence upon user preferences, user demographics, and client device attributes.

6. The method of claim 1 wherein the transcoding, selecting for inclusion in output streams, and communicating to client devices are all carried out in dependence upon current real time remote director instructions received from a director coupled to the content server through a servlet within the content server.

7. A method of macro control of streaming digital content, the method implemented in conjunction with a system that provides streaming the digital content from a multiplicity of sources of digital content to a multiplicity of client devices, the system including a content server through which the digital content is transcoded into output streams, the output streams communicated via network to client devices, the digital content selected for inclusion in output streams in dependence upon remote director instructions, the remote director instructions comprising hyperlinked URLs invoked through a network-capable device, the remote director instructions further comprising for each of the URLs in an instruction a computer program that is executed when the URL is invoked, the method comprising the steps of:

establishing a first start time for an event, the event comprising a multiplicity of sources of digital content, the event having a duration;

recording in non-volatile, machine-readable storage, the digital content storing in computer memory, during the duration of the event, macros, each of the macros comprising a URL and a first elapsed time, the URL being a hyperlinked URL component of a remote director instruction, the first elapsed time being the elapsed time after the first start time when the URL was first invoked through a hyperlink as part of the remote director instruction for control of streaming digital content, the macros being stored in the order in which the URLs are first invoked through hyperlinks;

establishing a second start time for retransmitting the event;

reading from computer memory the macros in the order in which the macros were stored;

invoking each of the URLs of each of the macros as a hyperlink at a second elapsed time after the second start time, the second elapsed time being approximately equal to the first elapsed time of the macro, invoking each of the URLs further comprising issuing a remote director instruction; and retrieving from the non-volatile, machine-readable storage, transcoding, selecting for inclusion in output streams, and communicating to client devices, in dependence upon remote director instructions, the digital content;

whereby a retransmission of an event is effected.

8. The method of claim 7 further comprising the steps of:

registering a user for a retransmission of an event, the retransmission of an event identified by an event identification code, the retransmission of an event comprising at least one video stream, at least one source, a start date and a start time;

logging in the user for the retransmission of an event, logging in the user further comprising assigning values to user login attributes, the user login attributes comprising user identification, device type, network address, and a tier;

assigning a tier value in dependence upon the device type and the event identification code;

wherein the selections are dependent upon the tier;

wherein transcoding further comprises transcoding in dependence upon the tier; and wherein communicating to at least one of the client devices the output video stream further comprises communicating the output video stream to the network address.

9. The method of claim 8 wherein:

registering a user further comprises creating an event registration record comprising event registration attributes comprising user id, event id, event subscription level, start date, and start time; and assigning a tier value further comprises assigning a tier value in dependence upon the event subscription level.

10. A system for macro control of streaming digital content, the system implemented in conjunction with a computer network including a content server through which the digital content is transcoded into streams of multimedia data, the streams communicated via network to client devices, the digital content selected for inclusion in streams in dependence upon remote director instructions, the remote director instructions comprising hyperlinked URLs invoked through a network-capable device, the remote director instructions further comprising for each of the URLs in the remote director instruction a computer program that is executed when the URL is invoked, the system comprising:

means for recording in non-volatile, machine-readable storage, the digital content.

means for storing in computer memory macros, each of the macros comprising a URL and a first time, the URL being a hyperlinked URL component of a remote director instruction, the first time being the time when the URL was first invoked through a hyperlink as part of the remote director instruction for control of streaming digital content, the macros being stored in the order in which the URLs are first invoked through hyperlinks;

means for reading from computer memory the macros in the order in which the macros were stored;

means for invoking each of the URLs of each of the macros as a hyperlink at a second time, the second time being dependent upon the first time, means for invoking each of the URLs further comprising means for formulating and means for issuing a remote director instruction; and means for retrieving from the non-volatile, machine-readable storage, means for transcoding, means for selecting for inclusion in output streams, and means for communicating to client devices, in dependence upon the remote director instructions, the digital content.

11. The system of claim 10 wherein means for recording the digital content further comprises means for recording approximately the original raw form of the digital content.

12. The system of claim 10 wherein means for issuing a remote director instruction further comprises means for executing upon a content server through a Java servlet within the content server computer programs identified by the URLs.

13. The system of claim 12 wherein the computer programs comprise Java thread-level URL dispatch routines.

14. The system of claim 10 wherein the means for transcoding, means for selecting for inclusion in output streams, and means for communicating to client devices are all implemented in dependence upon user preferences, user demographics, and client device attributes.

15. The system of claim 10 wherein the means for transcoding, means for selecting for inclusion in output streams, and means for communicating to client devices are all implemented in dependence upon current real time remote director instructions received from a director coupled to the content server through a servlet within the content server.

16. A system for macro control of streaming digital content, the system implemented in conjunction with a content server that provides streaming the digital content from a multiplicity of sources of digital content to a multiplicity of client devices, the digital content transcoded into output streams, the output streams communicated via network to client devices, the digital content selected for inclusion in output streams in dependence upon remote director instructions, the remote director instructions comprising hyperlinked URLs invoked through a network-capable device, the remote director instructions further comprising for each of the URLs in an instruction a computer program that is executed when the URL is invoked, the system comprising:

means for establishing a first start time for an event, the event comprising a multiplicity of sources of digital content, the event having a duration;

means for recording in non-volatile, machine-readable storage, the digital content;

means for storing in computer memory, during the duration of the event, macros, each of the macros comprising a URL and a first elapsed time, the URL being a hyperlinked URL component of a remote director instruction, the first elapsed time being the elapsed time after the first start time when the URL was first invoked through a hyperlink as part of the remote director instruction for control of streaming digital content, the macros being stored in the order in which the URLs are first invoked through hyperlinks;

means for establishing a second start time for retransmitting the event;

means for reading from computer memory the macros in the order in which the macros were stored;

means for invoking each of the URLs of each of the macros as a hyperlink at a second elapsed time after the second start time, the second elapsed time being approximately equal to the first elapsed time of the macro, means for invoking each of the URLs further comprising means for issuing a remote director instruction; and means for retrieving from the non-volatile, machine-readable storage, means for transcoding, means for selecting for inclusion in output streams, and means for communicating to client devices, in dependence upon remote director instructions, the digital content;

whereby a retransmission of an event is effected.

17. The system of claim 16 further comprising:

means for registering a user for a retransmission of an event, the retransmission of an event identified by an event identification code, the retransmission of an event comprising at least one video stream, at least one source, a start date and a start time;

means for logging in a user for the retransmission of an event, means for logging in a user further comprising means for assigning values to user login attributes, the user login attributes comprising user identification, device type, network address, and a tier;

means for assigning a tier value in dependence upon the device type and the event identification code;

wherein the selections are dependent upon the tier;

wherein means for transcoding further comprises means for transcoding in dependence upon the tier; and wherein means for communicating to at least one of the client devices the output video stream further comprises means for communicating the output video stream to the network address.

18. The system of claim 17 wherein:

means for registering a user further comprises means for creating an event registration record comprising event registration attributes including comprising user identification, event identification, event subscription level, start date, and start time; and means for assigning a tier value further comprises means for assigning a tier value in dependence upon the event subscription level.

19. A computer program product for macro control of streaming digital content, the computer program product implemented in conjunction with a computer network including a content server through which the digital content is transcoded into streams of multimedia data, the streams communicated via network to client devices, the digital content selected for inclusion in streams in dependence upon remote director instructions, the remote director instructions comprising hyperlinked URLs invoked through a network-capable device, the remote director instructions further comprising for each of the URLs in the remote director instruction a computer program that is executed when the URL is invoked, the computer program product comprising:

a recording medium;

means, recorded upon the recording medium, for recording in non-volatile, machine-readable storage, the digital content.

means, recorded upon the recording medium, for storing in computer memory macros, each of the macros comprising a URL and a first time, the URL being a hyperlinked URL component of a remote director instruction, the first time being the time when the URL was first invoked through a hyperlink as part of the remote director instruction for control of streaming digital content, the macros being stored in the order in which the URLs are first invoked through hyperlinks;

means, recorded upon the recording medium, for reading from computer memory the macros in the order in which the macros were stored;

means, recorded upon the recording medium, for invoking each of the URLs of each of the macros as a hyperlink at a second time, the second time being dependent upon the first time, means for invoking each of the URLs further comprising means for formulating and means for issuing a remote director instruction; and means, recorded upon the recording medium, for retrieving from the non-volatile, machine-readable storage, means for transcoding, means for selecting for inclusion in output streams, and means for communicating to client devices, in dependence upon the remote director instructions, the digital content.

20. The computer program product of claim 19 wherein means for recording the digital content further comprises means for recording approximately the original raw form of the digital content.

21. The computer program product of claim 19 wherein means for issuing a remote director instruction further comprises means for executing upon a content server through a Java servlet within the content server computer programs identified by the URLs.

22. The computer program product of claim 21 wherein the computer programs comprise Java thread-level URL dispatch routines.

23. The computer program product of claim 19 wherein the meuns for transcoding means for selecting for inclusion in output streams, and means for communicating to client devices are all implemented in dependence upon user preferences, user demographics, and client device attributes.

24. The computer program product of claim 19 wherein the means for transcoding, means for selecting for inclusion in output streams, and means for communicating to client devices are all implemented in dependence upon current real time remote director instructions received from a director coupled to the content server through a servlet within the content server.

25. A computer program product for macro control of streaming digital content, the computer program product implemented in conjunction with a content server that provides streaming the digital content from a multiplicity of sources of digital content to a multiplicity of client devices, the digital content transcoded into output streams, the output streams communicated via network to client devices, the digital content selected for inclusion in output streams in dependence upon remote director instructions, the remote director instructions comprising hyperlinked URLs invoked through a network-capable device, the remote director instructions further comprising for each of the URLs in an instruction a computer program that is executed when the URL is invoked, the computer program product comprising:

means, recorded upon the recording medium, for establishing a first start time for an event, the event comprising a multiplicity of sources of digital content, the event having a duration;

means, recorded upon the recording medium, for recording in non-volatile, machine-readable storage, the digital content;

means, recorded upon the recording medium, for storing in computer memory, during the duration of the event, macros, each of the macros comprising a URL and a first elapsed time, the URL being a hyperlinked URL component of a remote director instruction, the first elapsed time being the elapsed time after the first start time when the URL was first invoked through a hyperlink as part of the remote director instruction for control of streaming digital content, the macros being stored in the order in which the URLs are first invoked through hyperlinks;

means, recorded upon the recording medium, for establishing a second start time for retransmitting the event;

means, recorded upon the recording medium, for reading from computer memory the macros in the order in which the macros were stored;

means, recorded upon the recording medium, for invoking each of the URLs of each of the macros as a hyperlink at a second elapsed time after the second start time, the second elapsed time being approximately equal to the first elapsed time of the macro, means for invoking each of the URLs further comprising means for issuing a remote director instructiow and means, recorded upon the recording medium, for retrieving from the non-volatile, machine-readable storage, means for transcoding, means for selecting for inclusion in output streams, and means for communicating to client devices, in dependence upon remote director instructions, the digital content;

whereby a retransmission of an event is effected.

26. The computer program product of claim 25 further comprising:

means, recorded upon the recording medium, for registering a user for a retransmission of an event, the retransmission of an event identified by an event identification code, the retransmission of an event comprising at least one video stream, at least one source, a start date and a start time;

means, recorded upon the recording medium, for logging in a user for the retransmission of an event, means for logging in a user further comprising means for assigning values to user login attributes, the user login attributes comprising user identification, device type, network address, and a tier;

means, recorded upon the recording medium, for assigning a tier value in dependence upon the device type and the event identification code;

wherein the selections are dependent upon the tier;

wherein means for transcoding further comprises means for transcoding in dependence upon the tier; and wherein means for communicating to at least one of the client devices the output video stream further comprises means for communicating the output video stream to the network address.

27. The computer program product of claim 26 wherein:

means for registering a user further comprises means for creating an event registration record comprising event registration attributes including comprising user identification, event identification, event subscription level, start date, and start time; and means for assigning a tier value further comprises means for assigning a tier value in dependence upon the event subscription level.

* * * * *